US011897004B2

(12) United States Patent
Haugen et al.

(10) Patent No.: US 11,897,004 B2
(45) Date of Patent: Feb. 13, 2024

(54) SYSTEM AND METHOD TO CLEAN A RANGE EXHAUST

(71) Applicant: Restaurant Technologies, Inc., Mendota Heights, MN (US)

(72) Inventors: Kyle Haugen, Eagan, MN (US); Jason Platz, Mendota Heights, MN (US)

(73) Assignee: Restaurant Technologies, Inc., Mendota Heights, MN (US)

( * ) Notice: Subject to any disclaimer, the term of this patent is extended or adjusted under 35 U.S.C. 154(b) by 0 days.

(21) Appl. No.: 17/368,016

(22) Filed: Jul. 6, 2021

(65) Prior Publication Data

US 2022/0008968 A1 Jan. 13, 2022

Related U.S. Application Data

(60) Provisional application No. 63/048,924, filed on Jul. 7, 2020.

(51) Int. Cl.

| | |
|---|---|
| ***B08B 3/00*** | (2006.01) |
| ***B08B 13/00*** | (2006.01) |
| ***B08B 3/02*** | (2006.01) |
| ***B08B 3/08*** | (2006.01) |
| ***F24C 15/20*** | (2006.01) |
| ***B08B 9/032*** | (2006.01) |

(52) U.S. Cl.

CPC ................ *B08B 13/00* (2013.01); *B08B 3/02* (2013.01); *B08B 3/08* (2013.01); *B08B 9/0325* (2013.01); *F24C 15/2042* (2013.01); *F24C 15/2057* (2013.01); *B08B 2203/027* (2013.01); *B08B 2209/032* (2013.01)

(58) Field of Classification Search

None

See application file for complete search history.

(56) References Cited

U.S. PATENT DOCUMENTS

| | | | |
|---|---|---|---|
| 3,805,685 | A | 4/1974 | Carns |
| 5,472,342 | A | 12/1995 | Welsh et al. |
| 6,626,190 | B2 | 9/2003 | Durth et al. |
| 7,963,282 | B2 | 6/2011 | Griffin et al. |
| 9,550,686 | B2 | 1/2017 | Macdougall |

(Continued)

FOREIGN PATENT DOCUMENTS

| | | | |
|---|---|---|---|
| CN | 2700741 | Y | 5/2005 |
| CN | 203517943 | U | 4/2014 |

(Continued)

OTHER PUBLICATIONS

Asmuin, Norzelawati et al. "Simulation of water mist spray for commercial kitchen ventilation (CKV) system using Asys-CFD," Applied Mechanics and Materials vol. 660, 2014, pp. 704-708.

*Primary Examiner* — Eric W Golightly

(74) *Attorney, Agent, or Firm* — Dorsey & Whitney LLP

(57) ABSTRACT

A method for cleaning a cooking range exhaust system includes, in response to receipt of a start signal at a control box of a cooking range exhaust cleaning system to initiate a cleaning operation, causing a cleaning solution comprising a mixture of detergent and water having a ratio based on a target mixing ratio to be provided to a supply line, and causing an electronically-controlled valve to open to facilitate provision of the cleaning solution to a nozzle coupled to the electronically-controlled valve via a conduit for a predetermined period of time, wherein the nozzle is arranged to spray a zone of the cooking range exhaust system.

12 Claims, 5 Drawing Sheets

(56) References Cited

U.S. PATENT DOCUMENTS

| | | | |
|---|---|---|---|
| 10,195,470 | B2 | 2/2019 | Livchak et al. |
| 2018/0304316 | A1 | 10/2018 | Khandjian et al. |

FOREIGN PATENT DOCUMENTS

| | | | |
|---|---|---|---|
| CN | 204757065 | U | 11/2015 |
| CN | 108870485 | A | 11/2018 |
| WO | 2018129619 | A1 | 7/2018 |
| WO | 2019075991 | A1 | 4/2019 |

SYSTEM AND METHOD TO CLEAN A RANGE EXHAUST

CROSS REFERENCE TO RELATED APPLICATION(S)

This application claims the benefit under 35 U.S.C. 119 of the earlier filing date of U.S. Provisional Application 63/048,924 entitled "SYSTEM AND METHOD TO CLEAN A RANGE EXHAUST", filed Jul. 7, 2020. The aforementioned provisional application is hereby incorporated by reference in its entirety, for any purpose.

BACKGROUND

Cooking ranges may have various types of exhaust systems (e.g., hood, backsplash, flue, connecting pipes or conduit, etc.) designed to exhaust cooking effluent (e.g., smoke, odors, grease, other types of cooking effluent, etc.) away from the cooking range. Over time, grease and other particles that are entrained in the exhaust effluent may be deposited on the surfaces of the exhaust system to form a film. This film may present a fire hazard, as it contains grease and other flammable materials from the cooking effluent. Manually scheduling cleaning of the film from the exhaust systems can lead to overcleaning, which may lead to waste, or undercleaning, which may lead to the aforemention hazards.

DETAILED DESCRIPTION

Figure 1A:
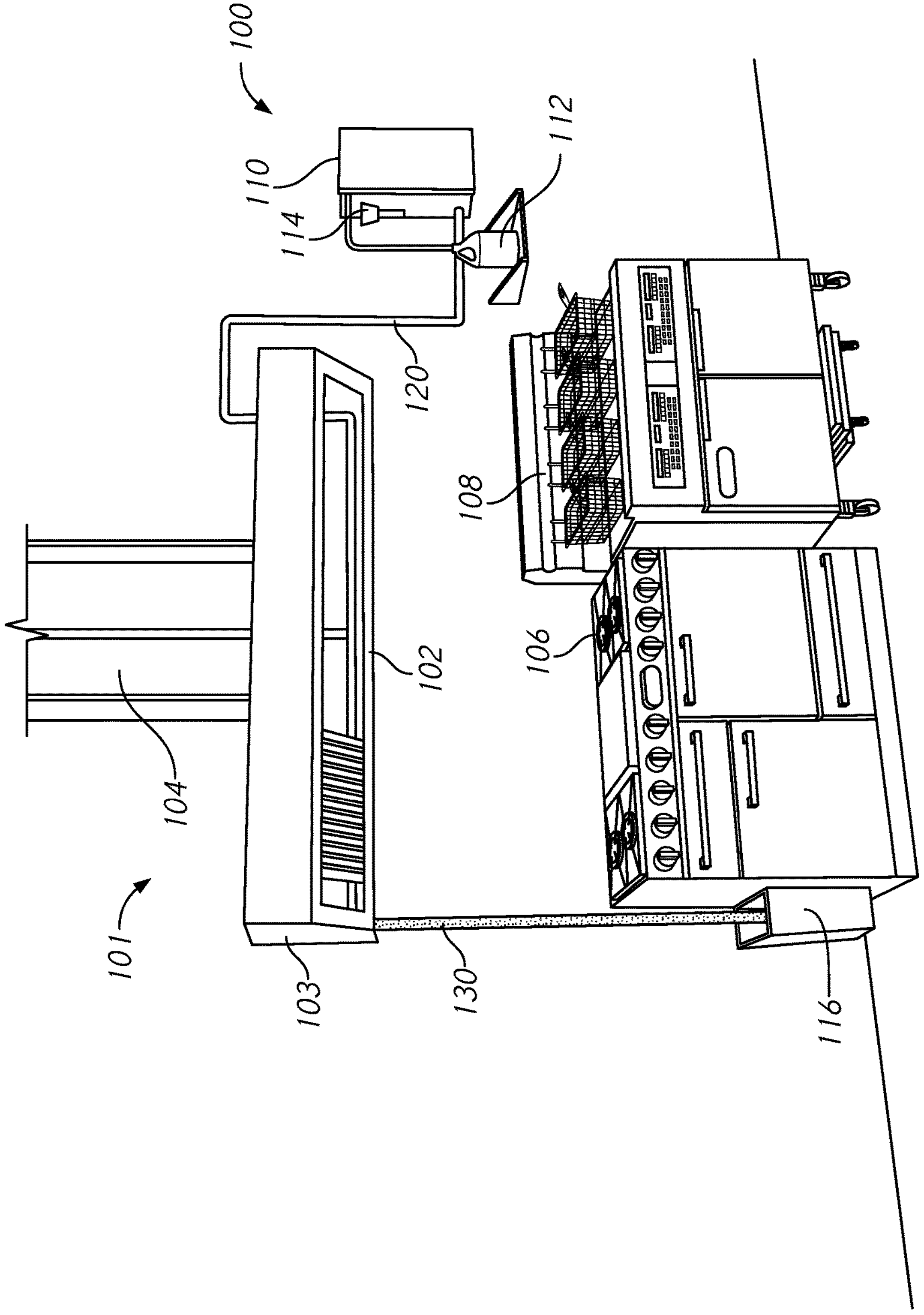
FIGS. 1A-1C depict a diagrams illustrating an exemplary automated range exhaust cleaning system configured to clean deposited film from surfaces of a cooking range exhaust system in accordance with embodiments of the disclosure.

Certain details are set forth below to provide a sufficient understanding of embodiments of the disclosure. It will be clear to one skilled in the art, however, that embodiments of the disclosure may be practiced without various aspects of these particular details. In some instances, well-known circuits, control signals, timing protocols, computer system components, and software operations have not been shown in detail in order to avoid unnecessarily obscuring the described embodiments of the disclosure.

This disclosure describes embodiments of an automated cooking range exhaust cleaning system (system) that may be configured to automatically clean the film from a cooking range exhaust system. As part of the cleaning process, the systemmay apply a degreasing solution.

In some embodiments, the automated cooking range exhaust cleaning system includes a spray system with conduit and nozzles disposed in the cooking range exhaust system and arranged to spray surfaces with a detergent solution and/or water. The spray system may be divided into zones that are each independently activated or controlled.

The system may further include a control box that is configured to control operation of the spray system, including cleaning operation parameters or configurations for individual zones. The control box may control, on a zone-by-zone basis, scheduling cleaning operations (e.g., frequency and times), a duration of a cleaning cycle, detergent-to-water ratios, number of spray cycles per cleaning operation, duration of individual spray cycles. In some examples, the control box may include a wireless interface (e.g., Wi-Fi, Bluetooth, etc.) for providing cleaning operation data, completed or missed cleaning cycles, receiving configuration settings, providing status information (e.g., online or offline, faults or errors, etc.), etc., or any combination thereof. The control box may interface with an electronic device (e.g., a smartphone, tablet, any other computing or electronic device, etc.) via the wireless interface. Additionally or alternatively, the control box may include a wired interface for providing cleaning operation data, completed or missed cleaning cycles, receiving configuration settings, providing status information (e.g., online or offline, faults or errors, etc.), etc., or any combination thereof. Thus, the wireless and/or wired interface may facilitate configuration of the control box to control operation of the automated range cleaning system according to specified settings.

The control box may control output devices, such as switches, solenoids, water and detergent pumps, valves, etc. The control box may further monitor various input devices, such as timing sensors, timers, cancel/abort input signals, etc. In some examples, the control box may include a microcontroller and a memory that is programmed with instructions to control or perform methods or operation described herein. In some examples, the control box includes a programmable logic controller (PLC) configured to be programmed to control or perform methods or operations described herein.

In some examples, the control box may monitor one or more float switches from a set of float switches in real time before the cleaning operation to determine how much volume of detergent needs to be added by a detergent pump to meet the desired detergent and water mixing ratio. Float switches may be actuated by incoming water from the water supply as it fills a reservoir. The control box may set a different mixing ratio for each individual spray during the cleaning operation.

In other examples, the control box may implement a post-mix operation such that a mixing ratio is controlled via a set of electronically-controlled valves to meter the water supply and the detergent such that they are mixed at the point they enter the conduit according to a target mixing ratio. The control box may control the set of valves to independently set a mixing ratio for each individual zone.

In some examples, the control box initiates a cleaning operation on a zone-by-zone basis. In some examples, the control box is limited to causing one zone to be cleaned at a time, with one or more of the zones cleaned sequentially. That is, once a cleaning operation with one zone is complete, the control box may initiate a cleaning operation on a second zone according to a cleaning schedule, and once the cleaning operation for the second zone complete, a cleaning operation for a third zone (if applicable) may be initiated. In other examples, two or more zones may be cleaned contemporaneously. In some examples, two zones with common target detergent-to-water ratios may be cleaned contemporaneously. A determination of a number of zones capable of being cleaned contemporaneously may be based available supply water volume and pressure, pump capacity, duration of the cleaning operation, and cleaning solution (e.g., water and detergent mixture) volume and pressure for selected zones.

The respective cleaning operation for each zone may be individually configured independent of other zones. For example, for a single cleaning operation of a particular zone, the control box may be programmed to specify number of spray cycles, a duration of each spray cycle, a mixing ratio of detergent and water, a number of and duration of each water rinse spray cycle, or any combination thereof. The control box may be further programmed to specify a schedule for a particular cleaning operation in each zone.

In some examples, the cleaning system may include sensors (e.g., cameras or other sensors capable of detecting the film on the surfaces of the exhaust system. In some examples, the control box may periodically receive data from the sensors indicating a level of film deposit, and may determine whether to schedule a cleaning operation based on the data. In some examples, rather than being purely time-based, the control box may end a cleaning operation in response to data from the sensors indicating that the surfaces of the exhaust system are sufficiently clean. In some examples, the control box may determine whether a completed cleaning operation was successful based on the data from the sensors. In some examples, the control box may provide the sensor data to a backend system to be analyzed and stored.

The control box may be configured to provide data related to operation of the automated cooking range exhaust cleaning system, such as cycles completed, cycle duration, amount of detergent used, sensed film deposit data, etc., or any combination thereof. The information may be stored in a database. The database may also include inspection data that indicates whether the cleaning operations are meeting expected standards. The database may provide alerts if cleaning operations need to be adjusted for not meeting expected standards. The database may also provide alerts if received data indicates that operation of a particular automated cooking range exhaust cleaning system is not as expected, such as missing scheduled cleaning operations, duration of an operation is not as expected, more or less detergent is being used than expected, etc., or any combination thereof.

Figure 1B:
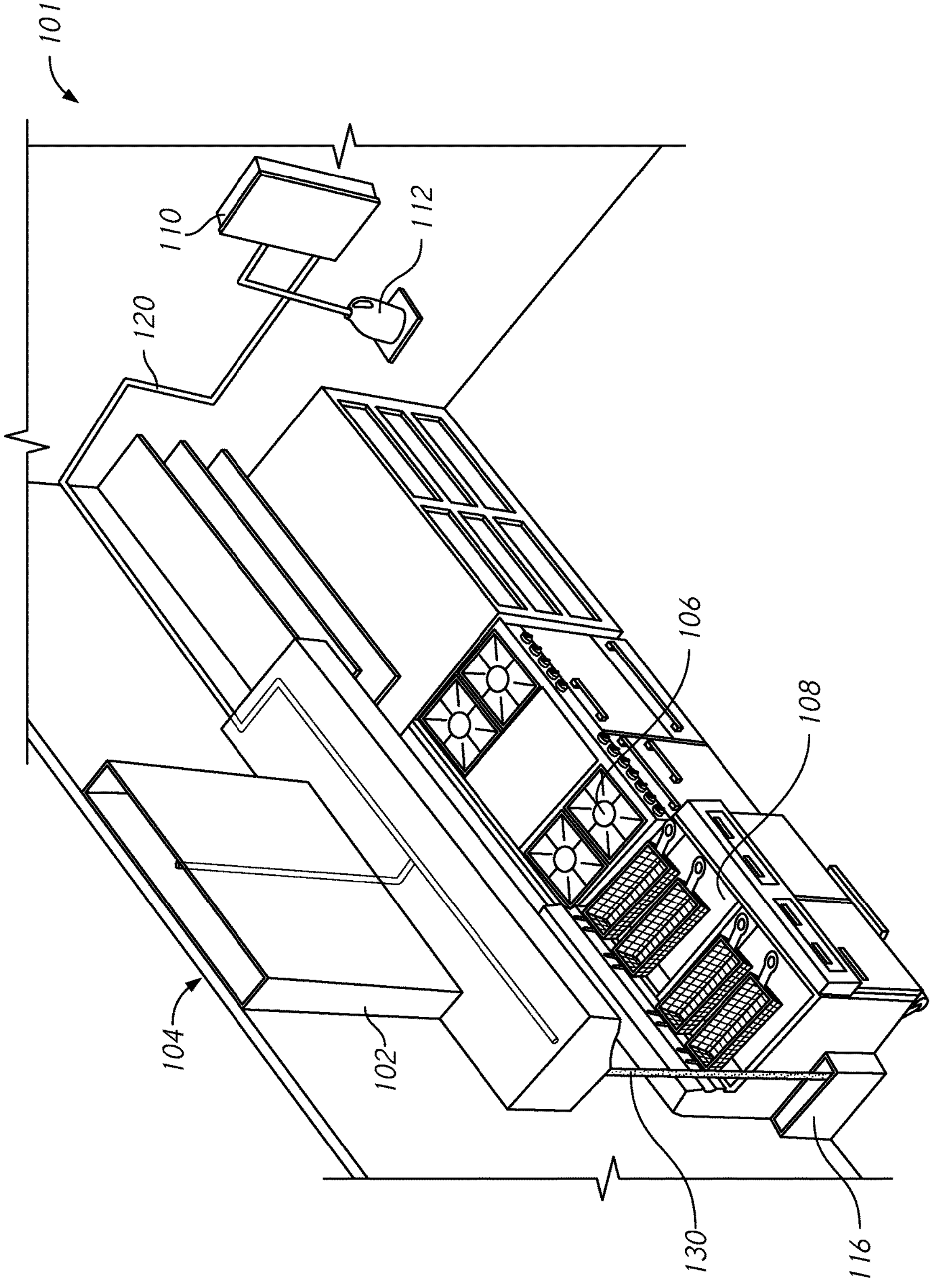
Figure 1C:
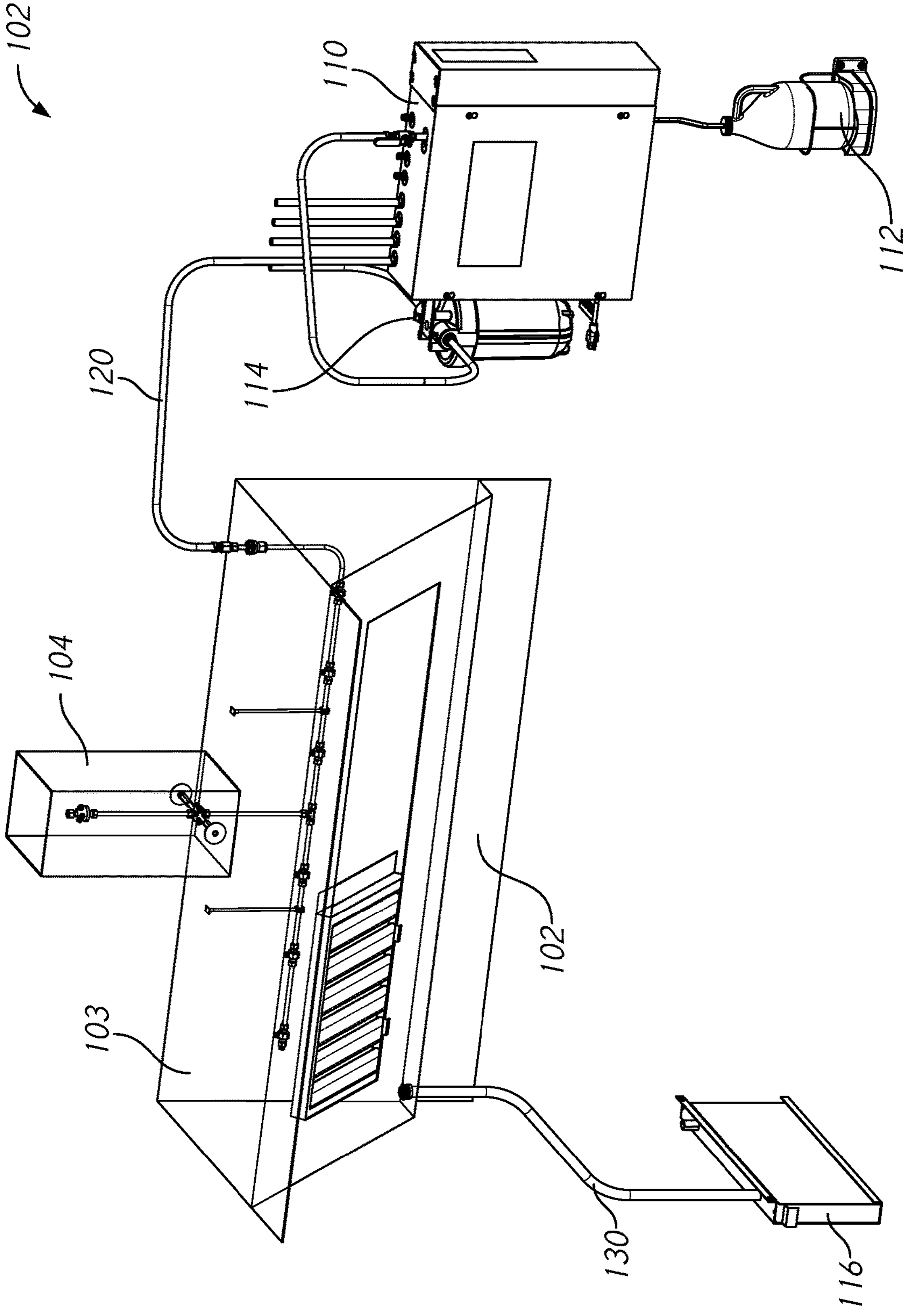

FIGS. 1A-1C depict a diagrams illustrating an exemplary automated range exhaust cleaning system 100 configured to clean deposited film from surfaces of a cooking range exhaust system 101 (e.g., including a backsplash 102, a hood 103, a flue 104, and any connecting pipes or conduit) in accordance with embodiments of the disclosure. The system 100 includes a control box 110, a detergent supply 112, a water supply inlet 114, a waste reservoir 116, and conduit 120. The cooking range exhaust system 101 may remove or exhaust cooking effluent (e.g., smoke, odors, grease, other types of cooking effluent, etc.) away from a cooking range 106 and/or a 108. Over time, grease and other particles that are entrained in the exhaust effluent may be deposited on the surfaces of the backsplash 102, the hood 103, the flue 104, etc. to form a film. The system 100 may be configured to automatically clean the film from the cooking range exhaust system 101, which may include application of a degreasing solution. In some examples, the system 100 is only configured to clean inside surfaces of the cooking range exhaust system 101 (e.g., inside of the hood 103 and the flue 104, but not the outside of the hood 103 or the flue 104, filters; or the backsplash 102).

In some embodiments, the system 100 includes a spray system with conduit 120 disposed in, on, or proximate to parts of the cooking range exhaust system 101, the hood 103 and/or the flue 104, and may be arranged to spray surfaces with a detergent solution and/or water. In some examples, the conduit 120 may include two or more zones of independently activated or controlled groups of nozzles. In some examples, the zones may each have an independent set of pipes. In other examples, the zones may share some pipes with other zones, yet the nozzles are independently activated or controlled.

The control box 110 may be configured to control operation of the system 100, including cleaning operation parameters or configurations for individual zones of the conduit 120. The control box 110 may receive water at a water supply inlet 114. The water supply inlet 114 may include a filter to filter the supply water prior to entering the system 100. The control box 110 may also receive detergent from a detergent supply 112. The control box 110 may be programmed to control, on a zone-by-zone basis, scheduling cleaning operations (e.g., frequency and times), a duration of a cleaning cycle, detergent-to-water ratios, number of spray cycles per cleaning operation, duration of individual spray cycles, or any combination thereof. In some examples, the control box 110 may include a wireless interface (e.g., Wi-Fi, Bluetooth, etc.) for providing cleaning operation data, completed or missed cleaning cycles, receiving configuration settings, providing status information (e.g., online or offline, faults or errors, etc.), etc., or any combination thereof. The control box 110 may interface with an electronic device (e.g., a smartphone, tablet, any other computing or electronic device, etc.) via the wireless interface. Additionally or alternatively, the control box 110 may include a wired interface for providing cleaning operation data, completed or missed cleaning cycles, receiving configuration settings, providing status information (e.g., online or offline, faults or errors, etc.), etc., or any combination thereof. Thus, the wireless and/or wired interface may facilitate configuration of the control box 110 to control operation of the system 100 according to specified settings.

The spent cleaning solution and film debris removed from the cooking range exhaust system 101 may drain via a waste conduit 130 to a waste reservoir 116, which may be emptied as necessary. In some examples, the waste conduit 130 may connect directly to a common drain (e.g., rather than to the waste reservoir 116) configured to receive other wastewater from the kitchen operations.

The control box 110 may control output devices, such as, solenoids, water and detergent pumps, valves, etc. The control box 110 may further monitor various input devices, such as timing sensors, timers, cancel/abort input signals, float switches, etc. In some examples, the control box 110 may include a microcontroller and a memory that is programmed with instructions to control or perform methods or operation described herein. In some examples, the control box 110 includes a programmable logic controller (PLC) configured to be programmed to control or perform methods or operations described herein.

In some examples, the control box 110 may monitor one or more float switches from a set of float switches in real time before the cleaning operation to determine how much volume of detergent from the detergent supply 112 needs to be added by a detergent pump to meet the desired detergent and water mixing ratio. The float switches may be actuated by incoming water from the water supply 114. The control box 110 may cause the detergent to be pumped from the detergent supply 112 to a reservoir attached to the control box 110. The control box 110 may set a different mixing ratio for each individual spray during the cleaning operation.

In other examples, the control box 110 may implement a post-mix operation such that a mixing ratio is controlled via a set of electronically-controlled valves to meter the water supply and the detergent supply 112 such that they are mixed at the point they enter the conduit 120 according to a target mixing ratio. The control box 110 may control the set of valves to independently set a mixing ratio for each individual zone.

In some examples, the control box 110 initiates a cleaning operation on a zone-by-zone basis. In some examples, the control box 110 is limited to causing one zone to be cleaned at a time, with one or more of the zones cleaned sequentially. That is, once a cleaning operation with one zone is complete, the control box 110 may initiate a cleaning operation on a second zone according to a cleaning schedule, and once the cleaning operation for the second zone complete, a cleaning operation for a third zone (if applicable) may be initiated. The process may continue to repeat for fourth, fifth, etc. zones. The control 110 may support programming to clean any number of different zones of a cooking range exhaust system 101, such as 4, 5, 6, 7, 8, or more zones. In other examples, two or more zones may be cleaned contemporaneously. In some examples, two zones with common target detergent-to-water ratios may be cleaned contemporaneously. A determination of a number of zones capable of being cleaned contemporaneously may be based available supply water volume and pressure, pump capacity, duration of the cleaning operation, and cleaning solution (e.g., water and detergent mixture) volume and pressure for selected zones.

The respective cleaning operation for each zone may be individually configured independent of other zones. For example, for a single cleaning operation of a particular zone, the control box may be programmed to specify number of spray cycles, a duration of each spray cycle, a mixing ratio of detergent and water, a number of and duration of each water rinse spray cycle, or any combination thereof. The control box 110 may be further programmed to specify a schedule for a particular cleaning operation in each zone, such as specifying performance of cleaning operations on specific days, excluding cleaning operation on specific days, scheduling cleaning operations after a set number of days or weeks, etc., or any combination thereof.

In some examples, the system 100 may include sensors (e.g., cameras or other sensors) (not shown) capable of detecting the film on the surfaces of the cooking range exhaust system 101. In some examples, the control box 110 may periodically receive data from the sensors indicating a level of film deposit, and may determine whether to schedule a cleaning operation based on the data. In some examples, rather than being purely time-based, the control box 110 may end a cleaning operation in response to data from the sensors indicating that the surfaces of the cooking range exhaust system 101 are sufficiently clean. In some examples, the control box 110 may determine whether a completed cleaning operation was successful based on the data from the sensors. In some examples, the control box 110 may provide the sensor data to a backend system to be analyzed and stored.

The control box 110 may be configured to provide data related to operation of the system 100, such as cycles completed, cycle duration, amount of detergent used, sensed film deposit data, etc., or any combination thereof. The information may be stored in a database. The database may also include inspection data that indicates whether the cleaning operations are meeting expected standards. The database may provide alerts if cleaning operations need to be adjusted for not meeting expected standards. The database may also provide alerts if received data indicates that operation of a particular automated cooking range exhaust cleaning system is not as expected, such as missing scheduled cleaning operations, duration of an operation is not as expected, more or less detergent is being used than expected, etc., or any combination thereof.

It is appreciated that the system 100 and the cooking range exhaust system 101 are exemplary, and that the components of the system 100 and/or the cooking range exhaust system 101 may be arranged differently, or may include fewer or additional components, without departing from the scope of the disclosure.

Figure 2:
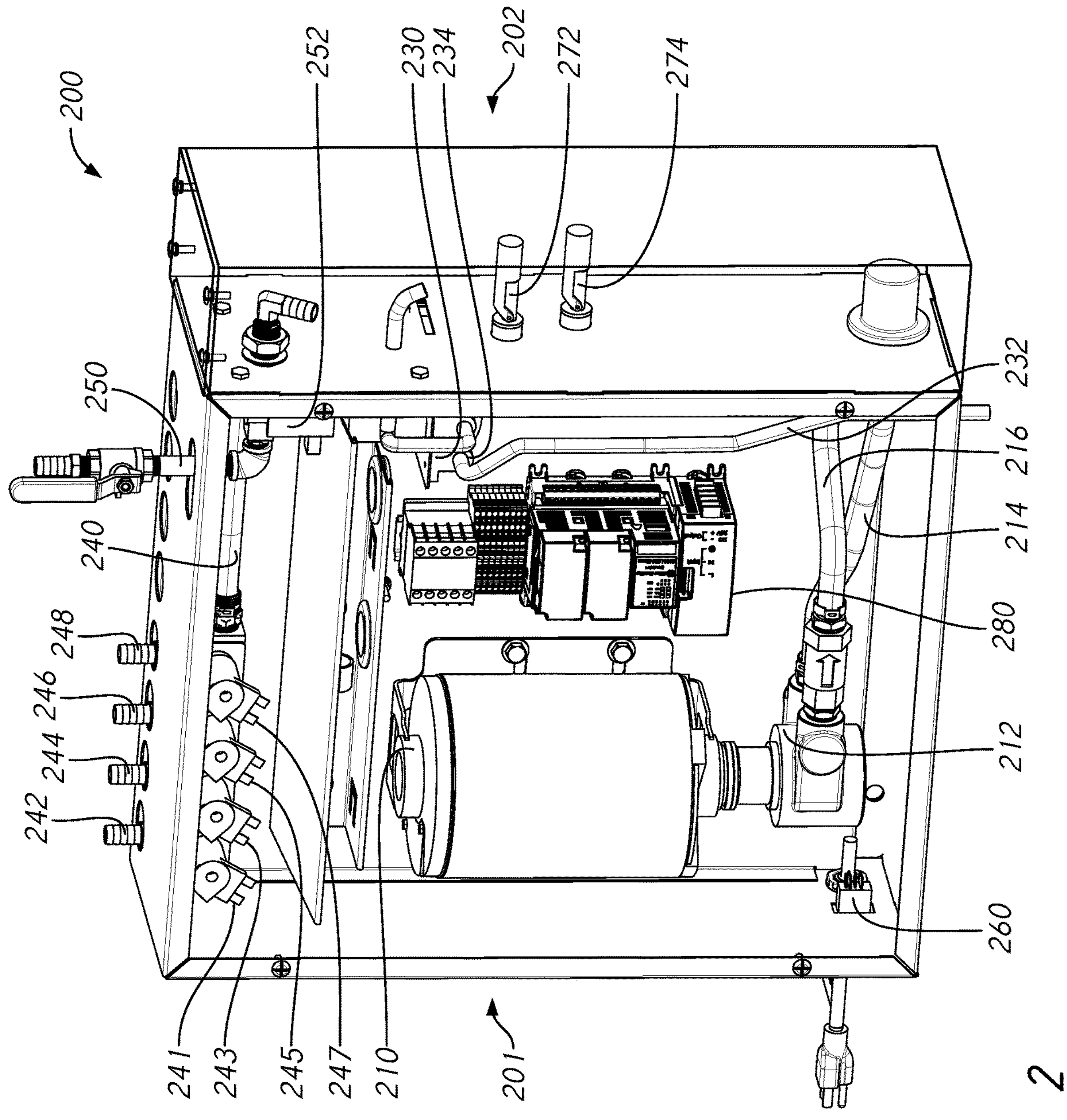
FIG. 2 depicts a diagrams illustrating an exemplary control box for an automated range exhaust cleaning system configured to clean deposited film from surfaces of a range exhaust system in accordance with embodiments of the disclosure.

FIG. 2 depicts a diagrams illustrating an exemplary control box 200 for an automated range exhaust cleaning system configured to clean deposited film from surfaces of a range exhaust system in accordance with embodiments of the disclosure. The control box 200 may be implemented in the control box 110 of FIGS. 1A-1C, in some examples, The control box 200 may receive power via a power supply connector 260 and may include a controller 280 to control operation of components of the control box 200. The controller 280 may include a microcontroller and memory, PLC controllers, field-programmable gate arrays, application-specific integrated circuits, or any combination thereof, that are capable of being programmed to perform operations described herein. The controller 280 may include various modules, circuits, sets of instructions, etc. to perform various operations described herein, such as a power supply, a spray scheduler, a valve controller, a pump controller, a mixing valve controller, a float switch monitor, timers, etc. In some examples, the controller 280 may include a memory configured to store executable instructions, and a processor or processing circuitry configured to execute the executable instructions to perform operations described herein.

In some examples, the controller 280 may include hardware and/or software configured enable connectivity to external devices and/or applications to perform various operations or functions, such as updating, monitoring, controlling, or any combination thereof. In some examples, the controller 280 may be configured to directly connect to an external computing device (e.g., a computer, a handheld device, a tablet, a smart phone, or any combination thereof). The direct connection may be via a physical connector or port (e.g., a universal serial bus (USB) port, a micro USB port, a serial port, an ethernet port, or any other type of connectivity port) In other examples, the direct connection may be a wireless direct connection, such BlueTooth®, ZigBee®, Z-Wave®, near-field communication, and/or any other type of direct communication. In some examples, the controller 280 may be configured to communicate over a network, including a cellular network, a local area network, a wide-area network, or any combinations thereof. In some examples, the controller 280 may utilize the connectivity to provide various notifications, such as missed, interrupted, completed, etc., cleaning cycles; failure or fault information; notification of low detergent; notification of a full waste reservoir, etc. The controller 280 may further utilize the connectivity to provide cleaning cycle data, such as cycle duration for each zone, amount of detergent used, mixing ratio, etc. The controller 280 may further utilize the connectivity to receive schedule module updates, cleaning cycle changes (e.g., mixing ratios, durations, etc. for each zone), to respond to requests for data, etc.

The control box 200 may include a control systems portion 201 and a reservoir 202. The control box 200 may include a water supply valve 252 connected to a water supply line 250. The controller 280 may be configured to control the water supply valve 252 to fill the reservoir 202 in preparation for a cleaning operation. The controller 280 may be configured to monitor float switches 272 and 274 in the controller 280 to determine when the reservoir 202 is sufficiently filled. The controller 280 may determine an amount of water held in the reservoir 202 based on a capacity of the reservoir 202, a time between activation of the float switches 272 and 274, or combinations thereof.

The control box 200 may also include a detergent pump 230 configured to pump detergent received via an inlet 232 to the reservoir 202 via an outlet 234. The detergent pumped via the detergent pump 230 into the reservoir 202 may mix with the water in the reservoir 202 to form a cleaning solution. The controller 280 may control the detergent pump 230 to pump (e.g., control a speed of the pump, length of time the pump is activated, or combinations thereof) to achieve the target detergent-to-water ratio.

The controller 280 may be configured to control a motor 210 connected to a pump 212 to pump the cleaning solution (e.g., or water if not detergent is added to the reservoir 202) from the reservoir 202 via an inlet 214 to a supply line 240 via an outlet 216. The control box 200 further includes valves 241, 243, 245, and 247 coupled to the supply line 240. The controller 280 may control the valves 241, 243, 245, and 247 to provide the cleaning solution (e.g., water and detergent mixture) from the reservoir 202 to outlet ports 242, 244, 246, and 248, respectively. The valves 241, 243, 245, and 247 may include solenoids or some other mechanism configured to receive electrical signals from the controller 280 to control positions of the valves 241, 243, 245, and 247. The ports 242, 244, 246, and 248 may each be coupled to a different respective cleaning zone.

The arrangement of components in the control box 200 depicted in FIG. 2 is exemplary. A different arrangement of components may be implemented without departing from the scope of the disclosure. In addition, additional or fewer parts may be included without departing from the scope of the disclosure. The control box 200 may be configured to perform operations of the control box 110 as described with reference to FIGS. 1A-1C. In some examples, rather than premixing the detergent and the water in the reservoir 202, the control box 200 may include a post-mixing application whereby the pump 212 and the detergent pump 230 are both coupled directly to the supply line 240, and the controller 280 is configured to cause the pump 212 and the detergent pump 230 to operate contemporaneously to pump water and detergent, respectively, to the supply line 240 such that it is mixed in the supply line 240.

Figure 3:
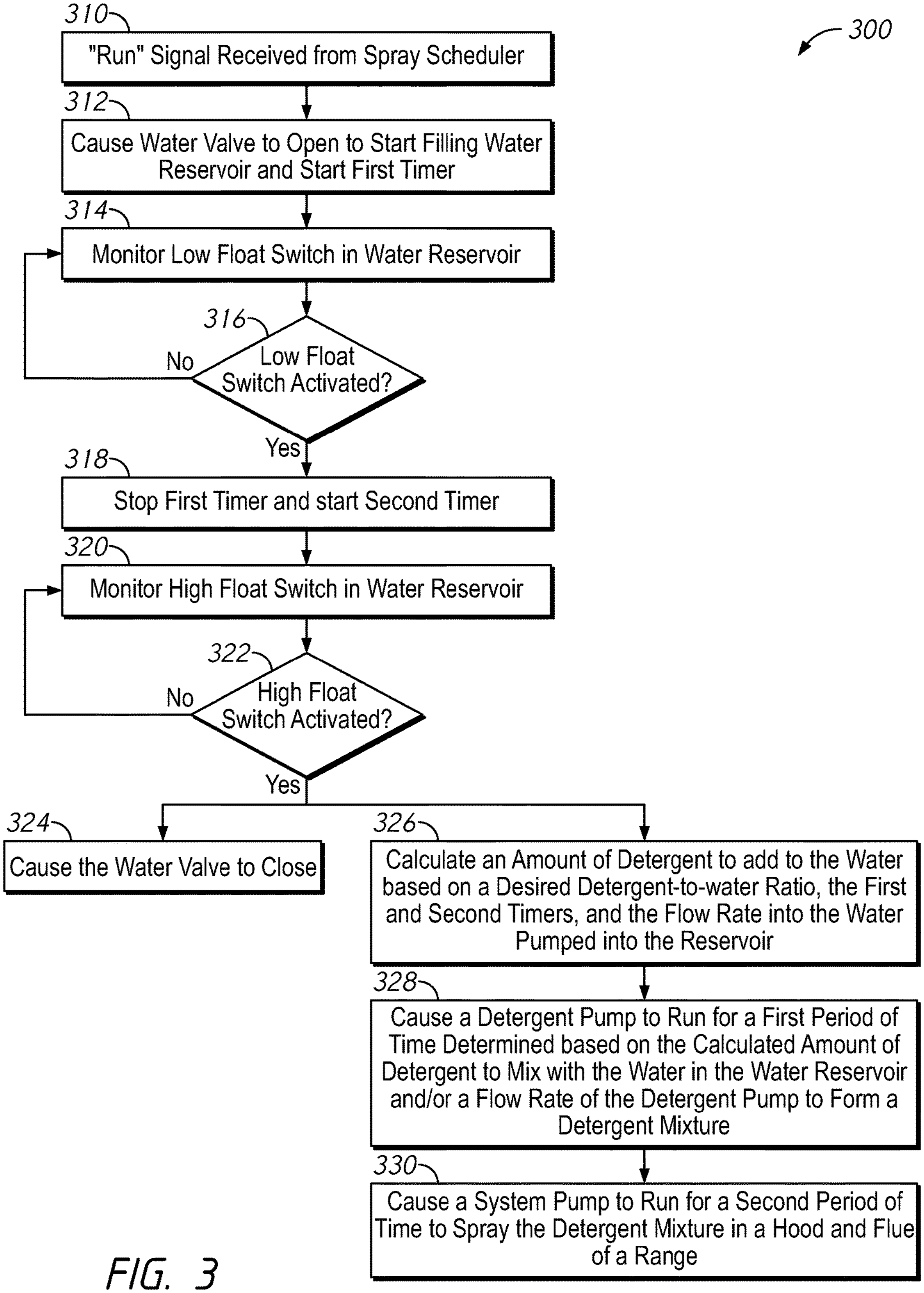
FIG. 3 is an exemplary flowchart of a method for performing a cleaning operation via an automated range exhaust cleaning system in accordance with embodiments of the present disclosure.

FIG. 3 is an exemplary flowchart of a method 300 for performing a cleaning operation via an automated range exhaust cleaning system in accordance with embodiments of the present disclosure. The method 300 may be performed by the control box 110 of FIGS. 1A-1C, the control box 200 of FIG. 2, or combinations thereof.

The method 300 may include receiving a run signal from a spray scheduler, at 310. The spray scheduler may be an application hosted on another device that is connected to the control box wirelessly or via a wired connection. In other examples, the spray scheduler is a module stored at the control box that maintains scheduling information for cleaning operations for the one or more zones of the cooking range exhaust system. In other examples, the method 300 may include receiving a run signal from a module configured to determine whether a film on the surfaces of the cooking range exhaust system exceeds a threshold based on data from one or more sensors or cameras.

The method 300 may further include causing a water valve to open to start filling a water reservoir and start a first timer, at 312. The method 300 may further include monitoring a low float switch (e.g., the float switch 274 of FIG. 2) in the water reservoir (e.g., the reservoir 202 of FIG. 2), at 314. The method 300 may further include determining whether the low float switch is activated, at 316. In response to a determination that the low float switch remains inactive, the method 300 may further include continuing to monitor the low float switch in the water reservoir, at 314. In response to a determination that the low float switch is activated, the method 300 may further include stopping the first timer and starting a second timer, at 318.

The method 300 may further include monitoring a high float switch (e.g., the float switch 272 of FIG. 2) in the water reservoir, at 320. The method 300 may further include determining whether the high float switch is activated, at 322. In response to a determination that the high float switch remains inactive, the method 300 may further include continuing to monitor the high float switch in the water reservoir, at 320.

In response to a determination that the low float switch is activated, the method 300 may further include causing the water valve to close, at 324, and calculating an amount of detergent to add to the water based on a target detergent-to-water ratio, the first and second timers, and a flow rate of the water pumped into the reservoir, at 326. The method 300 may further include causing the detergent pump to run for a first period of time determined based on the calculated amount of detergent to mix with the water in the water reservoir and/or a flow rate of the detergent pump to form a detergent mixture, at 328. The method 300 may further include causing a system pump to run for a second period of time to cause the detergent to be provided to target nozzles for spraying the detergent and water solution in some or all of a range exhaust system, at 330. The range exhaust system may include the cooking range exhaust system 101 of FIGS. 1A-1C, in some examples. The target nozzles may include nozzles coupled to the conduit 120 of FIGS. 1A-1C.

In some examples, the method 300 may further include filling the reservoir with just water, can cause the water to be provided to the target nozzles to rinse the detergent from the cooking range exhaust system. In some examples, the method 300 may be performed multiple times for a single cleaning operation may (e.g., multiple cycles of detergent spray and/or rinse), with the water reservoir refilled for each detergent or water application.

In some examples, the method 300 may further include determining whether the surfaces of the cooking range exhaust system are sufficiently clean via cameras or other sensors. In some examples, the method 300 may further include providing data related to the cleaning operation to a database configured to log cleaning operation activity.

In some examples, the method 300 may be stored as executable instructions in memory or other computer-readable medium of a controller (e.g., the controller 280 of FIG. 2) of the control box. The executable instructions may be executed by a processor or processing circuitry to perform the method 300, in some examples.

Various illustrative components, blocks, configurations, modules, and steps have been described above generally in terms of their functionality. Persons having ordinary skill in the art may implement the described functionality in varying ways for each particular application, but such implementation decisions should not be interpreted as causing a departure from the scope of the present disclosure.

The previous description of the disclosed embodiments is provided to enable a person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as previously described.

What is claimed is:

1. A method, comprising:

in response to receipt of a start signal at a control box of a cooking range exhaust cleaning system to initiate a cleaning operation:

causing a reservoir to fill with a mixture of detergent and water having a ratio based on a target mixing ratio, wherein causing the reservoir to fill with the mixture of detergent and water includes monitoring a float switch mechanism at least partially in the reservoir to determine when the reservoir has filled to a minimum threshold with the water prior to causing the detergent to be added to the reservoir;

causing a cleaning solution comprising the mixture of detergent and water having the ratio based on a target mixing ratio to be provided to a supply line from the reservoir; and causing an electronically-controlled valve to open to facilitate provision of the cleaning solution to a nozzle coupled to the electronically-controlled valve via a conduit for a predetermined period of time, wherein the nozzle is arranged to spray a zone of a cooking range exhaust system.

2. The method of claim 1, further comprising causing a second electronically-controlled valve to couple the supply line to a second conduit configured to spray a second zone of the cooking range exhaust system based on a second start signal to initiate a second scheduled cleaning operation.

3. The method of claim 1, further comprising receiving the start signal from a scheduler.

4. The method of claim 1, further comprising receiving the start signal from a remote device via a wired or wireless interface.

5. The method of claim 1, further comprising providing data corresponding to the cleaning operation to a remote device via a wired or wireless interface.

6. The method of claim 1, further comprising:

monitoring data from sensors to determine whether film on the zone of the cooking range exhaust system exceeds a threshold; and providing the start signal in response to a determination that the film exceeds the threshold.

7. At least one machine-readable medium including instructions that, when executed by processing circuitry, cause the processing circuitry to:

in response to receipt of a start signal to initiate a cleaning operation:

cause a reservoir to fill with a mixture of detergent and water having a ratio based on a target mixing ratio, wherein causing the reservoir to fill with the mixture of detergent and water includes monitoring a float switch mechanism at least partially in the reservoir to determine when the reservoir has filled to a minimum threshold with the water prior to causing the detergent to be added to the reservoir;

cause a cleaning solution comprising the mixture of detergent and water having the ratio based on a target mixing ratio to be provided to a supply line from the reservoir; and cause a valve to open to facilitate provision of the cleaning solution to a nozzle coupled to the valve via a conduit for a predetermined period of time, wherein the nozzle is arranged to spray a zone of a cooking range exhaust system.

8. The at least one machine-readable medium of claim 7, wherein the instructions further cause the processing circuitry to cause detergent to be pumped into the reservoir after the reservoir is sufficiently filled.

9. The at least one machine-readable medium of claim 7, wherein the instructions further cause the processing circuitry to cause a second electronically-controlled valve to couple the supply line to a second conduit configured to spray a second zone of the cooking range exhaust system based on a second start signal to initiate a second scheduled cleaning operation.

10. The at least one machine-readable medium of claim 7, wherein the instructions further cause the processing circuitry to receive the start signal from a scheduler.

11. The at least one machine-readable medium of claim 7, wherein the instructions further cause the processing circuitry to:

receive the start signal from a remote device via a wired or wireless interface; and provide data corresponding to the cleaning operation to the remote device via the wired or wireless interface.

12. The at least one machine-readable medium of claim 7, wherein the instructions further cause the processing circuitry to:

monitor data from sensors to determine whether film on the zone of the cooking range exhaust system exceeds a threshold; and provide the start signal in response to a determination that the film exceeds the threshold.

* * * * *